(12) United States Patent
Williams et al.

(10) Patent No.: US 7,490,629 B2
(45) Date of Patent: Feb. 17, 2009

(54) PLUG KIT

(76) Inventors: Linda Williams, 1264 Jostin Dr., Clarksville, TN (US) 37040; Richard Williams, 1264 Jostin Dr., Clarksville, TN (US) 37040

( * ) Notice: Subject to any disclaimer, the term of this patent is extended or adjusted under 35 U.S.C. 154(b) by 0 days.

(21) Appl. No.: 11/531,772

(22) Filed: Sep. 14, 2006

(65) Prior Publication Data

US 2008/0066820 A1 Mar. 20, 2008

(51) Int. Cl.
*F16L 55/10* (2006.01)

(52) U.S. Cl. .......................... 138/89; 138/91; 215/319; 220/287; 220/254.1; 220/801; 220/DIG. 19

(58) Field of Classification Search ............. 220/254.1, 220/287, 802, 380, 789, 801, DIG. 19; 138/89, 138/91; 215/319, 365; 217/110
See application file for complete search history.

(56) References Cited

U.S. PATENT DOCUMENTS

| | | | | |
|---|---|---|---|---|
| 650,615 | A * | 5/1900 | Salomon ................... | 215/307 |
| 729,835 | A * | 6/1903 | Barnes et al. .............. | 215/299 |
| 2,889,089 | A * | 6/1959 | Herrick et al. ............. | 222/540 |
| 3,106,311 | A * | 10/1963 | Fairchild .................. | 220/269 |
| 3,307,552 | A * | 3/1967 | Strawn ..................... | 604/256 |
| 3,578,027 | A * | 5/1971 | Zopfi ....................... | 138/89 |
| 3,659,738 | A * | 5/1972 | Friedmann et al. ......... | 220/287 |
| 3,800,791 | A | 4/1974 | Visor | |
| 3,807,595 | A * | 4/1974 | Zundel ..................... | 220/260 |
| 3,821,969 | A * | 7/1974 | Sinko ....................... | 138/89 |
| 3,870,084 | A * | 3/1975 | Gezari ...................... | 138/89 |
| 3,987,930 | A * | 10/1976 | Fuson ....................... | 220/287 |
| 4,115,507 | A * | 9/1978 | Pico et al. .................. | 264/267 |
| 4,249,577 | A * | 2/1981 | Davis ....................... | 138/92 |
| 4,640,434 | A * | 2/1987 | Johnsen et al. ............. | 220/287 |
| 4,716,875 | A | 1/1988 | Troncoso, Jr. | |
| 4,750,525 | A * | 6/1988 | Vaughan .................... | 138/89 |
| 4,784,766 | A * | 11/1988 | Moritoki et al. ............ | 210/181 |
| 5,197,605 | A * | 3/1993 | Hampton ................... | 206/582 |
| 5,623,971 | A * | 4/1997 | Foernzler .................. | 138/89 |
| 5,915,418 | A * | 6/1999 | Turner ...................... | 138/89 |
| 6,036,541 | A | 3/2000 | Koumatsu | |
| 6,082,410 | A * | 7/2000 | Pohar ....................... | 138/89 |
| 6,223,957 | B1 * | 5/2001 | Hoppe ...................... | 222/563 |
| 6,360,779 | B1 * | 3/2002 | Wagner et al. .............. | 138/92 |
| 6,688,336 | B2 * | 2/2004 | Trichard .................... | 138/89 |
| 6,820,717 | B2 | 11/2004 | Fleming et al. | |

(Continued)

*Primary Examiner*—James F Hook
(74) *Attorney, Agent, or Firm*—Advantia Law Group; Michael W. Starkweather; Jason P. Webb

(57) ABSTRACT

A plug kit of sealing apertures. There is: a first plug, including: a first solid cylindrical flexible member, having: a first end with a first diameter; and a second end, opposite the first end, the second end having a second diameter smaller than the first diameter, wherein the diameter of the first solid cylindrical flexible member decreases step-wise along a length of the first solid cylindrical flexible member; and a second plug, including: a second solid cylindrical flexible member, having: a third end with a third diameter, wherein the third diameter is larger than the first diameter; and a fourth end, opposite the third end, the fourth end having a fourth diameter smaller than the third diameter, smaller than the first diameter, and larger than the second diameter, wherein the diameter of the second solid cylindrical flexible member decreases step-wise along a length of the second solid cylindrical flexible member.

11 Claims, 2 Drawing Sheets

U.S. PATENT DOCUMENTS

| | | |
|---|---|---|
| 7,033,215 B2 | 4/2006 | Kobayashi |
| 2005/0274568 A1 | 12/2005 | Falco et al. |
| 2006/0001264 A1 * | 1/2006 | Brass et al. ................. 285/901 |
| 2006/0102418 A1 | 5/2006 | Magidson |

* cited by examiner

PLUG KIT

BACKGROUND OF THE INVENTION

1. Field of the Invention

The present invention relates to plugs, specifically to plug kits for sealing apertures.

2. Description of the Related Art

In the related art, it has been known to use plugs to seal apertures of connectors, such as pipes and hoses. Plugs are often used to seal apertures of connectors to prevent leaks, spills, and contamination. Many plugs form air-tight seals which prevent the escape of matter from the aperture, as well as prevent matter from entering the aperture.

In addition, it has been known to use plugs of various shapes and sizes to seal apertures. In particular, it has been known to use plugs with lips to seal apertures. Such plugs generally have a tubular body with disk-shaped lips on an outer peripheral surface of the body spaced at equal intervals. Diameters of plugs may vary according to diameters of the lips.

Also, many plugs seal apertures by frictional resistance. Sealing by frictional resistance requires that plugs be flexible for insertion and removal. It is also beneficial for plugs to be somewhat elastic, and have memory, for reuse. However, it is desirable for plugs to retain some structural integrity for holding up against large amounts of pressure. Advantageously, plugs with lips can be brought into close contact with an inner wall of an aperture without significant distortion. Further, plug sealings may be reinforced by locking mechanisms or gap-fillers.

Because heavy equipment has numerous apertures with a multiplicity of shapes and sizes, there is a need for plugs which correspond to, and seal, apertures of heavy equipment. In particular, there is a need for plugs which are easy to select, are easy to install, which have a variety of diameters, which have an excellent memory, and which hold up against fuel and oil spills. Some improvements have been made in the field. Examples include but are not limited to the references described below, which references are incorporated by reference herein:

U.S. Pat. No. 4,716,875, issued to Troncoso, Jr., discloses a safety plug device for fuel lines. The safety plug device is adapted to reasonably plug the fluid fuel line of an internal combustion engine. The device has an external multiple stepped cylindrical configuration and/or central cavity with a like configuration so that it can be used effectively with various diameter of fuel lines and can either be inserted in the central opening of the fuel line or can be disposed over the fuel line, to prevent loss of fuel after the fuel line is removed from, for example a carburetor. The device is preferably of resilient elastomeric material resistant to deterioration by fuel and can include metal inserts, or be all metal, ceramic, etc. Moreover, because the plug device physically reinforces the fuel line, clamping of the fuel line at the plug device does not damage the fuel line. In one embodiment, the plug device includes an outer protective resilient sheath which enables clamps of a single diameter to be effectively used.

U.S. Patent Application Publication No.: 2005/0274568, by Falco et al., discloses a high sound attenuating hearing protection device. A hearing protection device insertable into an earcanal is provided, the device generally including a stem portion, a sound attenuating portion affixed to and extending at least partially over the stem portion, and a volume of space disposed between and delimited by the sound attenuating portion and the stem portion, where at least a part of the sound attenuating portion is collapsible into the volume of space during insertion of the hearing protection device into the earcanal.

U.S. Pat. No. 7,033,215, issued to Kobayashi, discloses a sealing plug and a watertight connector provided therewith. A rubber plug is inserted into a cavity of a connector housing after and insulated wire is inserted through a wire insertion hole to provide a watertight seal between an inner wall of the cavity and the insulated wire. Frictional resistance between the inner wall of the cavity and the rubber plug is larger that the frictional resistance between the insulated wire and the rubber plug. The frictional resistance between the insulated wire and the rubber plug permits movement of the insulated wire relative to the rubber plug when the insulated wire is caused to expand in longitudinal direction by heat.

U.S. Patent Application Publication No.: 2006/0102418, by Magidson discloses an earplug. An earplug composed of an injected molded resilient polymeric material for insertion into an ear canal by a fingertip of a user, including an elongated member having a nose portion formed as a curved front end. An open cup shaped rearward extending flange located at the end of the elongated member opposite to the nose portion and with the open cup shaped rearward extending flange configured to receive the fingertip of the user. The elongated member including at least one flange element located intermediate the nose portion and the open cup shape flange. The nose portion and the flange element having a generally curved shape to extend into and conform the wall of the ear canal. The earplug composed of a resilient polymer material having a relatively low Shore A Durometer hardness value.

U.S. Pat. No. 6,820,717, issued to Fleming et. al., discloses a pressure regulating earplug. An earplug is provided for use by an airplane passenger, which more slowly increases the pressure of air in the passenger's ear canal than the rate of increase in cabin air pressure as the airplane descends near the end of a flight. The earplug has a cavity that is open to the front end of the earplug, and with a restrictor at the front end of the cavity that allows air to pass between the cavity and ear canal, and the cavity to collapse, only at a very slow rate. As the environmental air pressure increases near the end of a flight, the earplug is slowly compressed in diameter and compresses the cavity.

U.S. Pat. No. 3,800,791, issued to Visor, discloses an adjustable ear plug. A flexible ear plug has flanges thereon of gradually increasing size. The plug can be inserted into an auditory canal after which the diameter of the flanges can be increased by forcing an insert into a cavity in the plug. One size plug, due to the variation in diameters of the flanges and the fact that the diameters can be increased by use of the insert fits all sizes of auditory canals.

U.S. Pat. No. 6,036,541, issued to Koumatsu, discloses a rubber plug with lips. The rubber plug includes a tubular body having a cross-sectionally corrugated inner surface including a plurality of conically shaped surfaces, and a plurality of lips formed integrally on and projecting radially outwardly from an outer surface of the tubular body in planes perpendicular to a longitudinal axis of the tubular body and including first, second and third lips, the plurality of lips being spaced along the longitudinal axis, wherein a distance between the first lip and the second lip in a direction of the longitudinal axis is different than a distance between the second and third lips in the direction of the longitudinal axis.

The inventions heretofore known suffer from a number of disadvantages, which include: having limited sealing surfaces, having limited sealing capacity, having limited memory, having an inability to hold up against fuel and oil spills, being difficult to select, being difficult to install, being limited in size, and/or having an inability to prevent contamination.

What is needed is a plug kit and/or device and/or system that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available plugs for apertures of heavy equipment. Accordingly, the present invention has been developed to provide a plug kit for sealing apertures.

In one embodiment there may be a plug kit for sealing apertures, including: a first plug for sealing an aperture, including: a first solid cylindrical flexible member, having: a first end with a first diameter; and/or a second end, opposite the first end, the second end having a second diameter smaller than the first diameter, wherein the diameter of the first solid cylindrical flexible member may decrease step-wise along a length of the first solid cylindrical flexible member; and/or a second plug for sealing an aperture, including: a second solid cylindrical flexible member, having: a third end with a third diameter, wherein the third diameter may be larger than the first diameter; and/or a fourth end, opposite the third end, the fourth end having a fourth diameter smaller than the third diameter, smaller than the first diameter, and/or larger than the second diameter, wherein the diameter of the second solid cylindrical flexible member may decrease step-wise along a length of the second solid cylindrical flexible member.

In another embodiment, the first plug and the second plug may be sized to correspond to an aperture of heavy equipment. In still another embodiment, the diameters of the second solid cylindrical flexible member may substantially different than the diameters of the first solid cylindrical flexible member. In yet another embodiment, the length of the first solid cylindrical member may be smaller than the length of the second solid cylindrical member. In even another embodiment, the first and/or second solid cylindrical flexible members may include polyurethane.

In a further embodiment, there may be a plug for sealing an aperture, including: a solid cylindrical flexible member, having: a first end with a first diameter; and/or a second end opposite the first end, the second end having a second diameter smaller than the first diameter, wherein the diameter of the cylindrical flexible member may decrease step-wise along a length of the cylindrical flexible member. In still a further embodiment, the plug may be sized to correspond to an aperture of heavy equipment. In yet a further embodiment, the solid cylindrical flexible member may include polyurethane.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
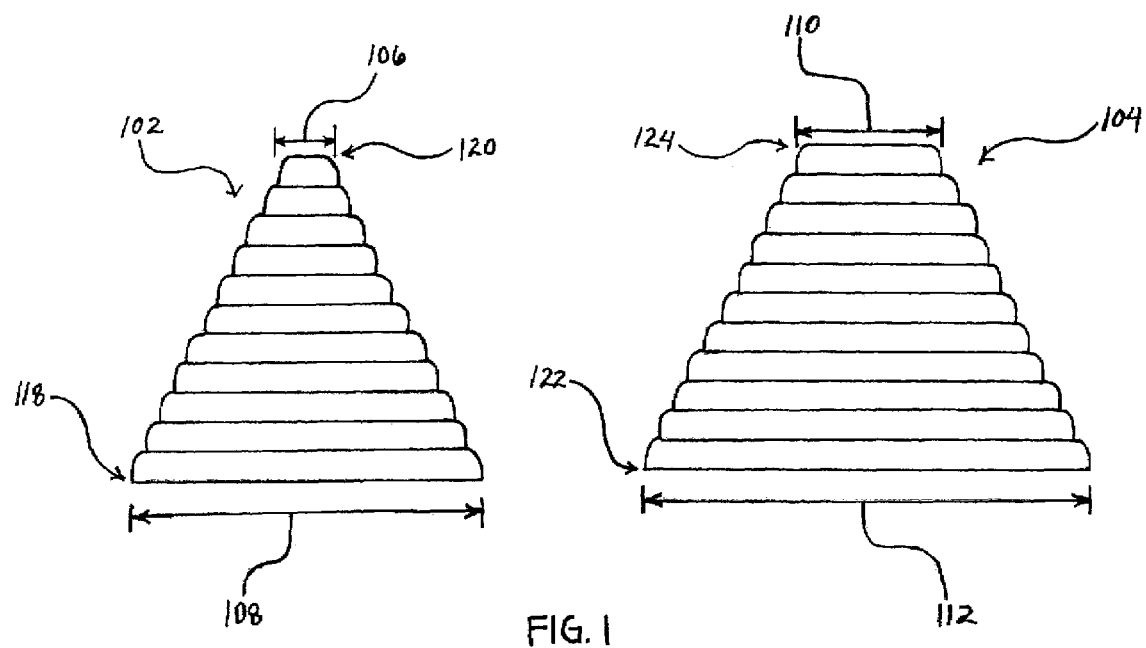
FIG. 1 is a front elevational view of a plug kit, according to one embodiment of the invention.
Figure 2:
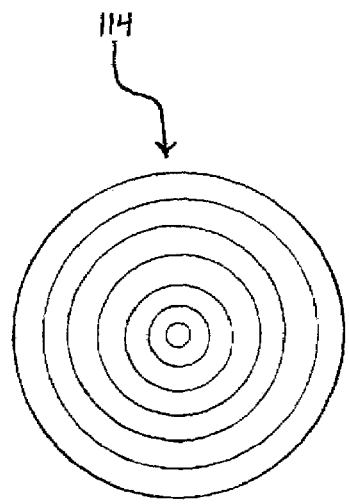
FIG. 2 is a top plan view of a plug, according to one embodiment of the invention.
Figure 3:
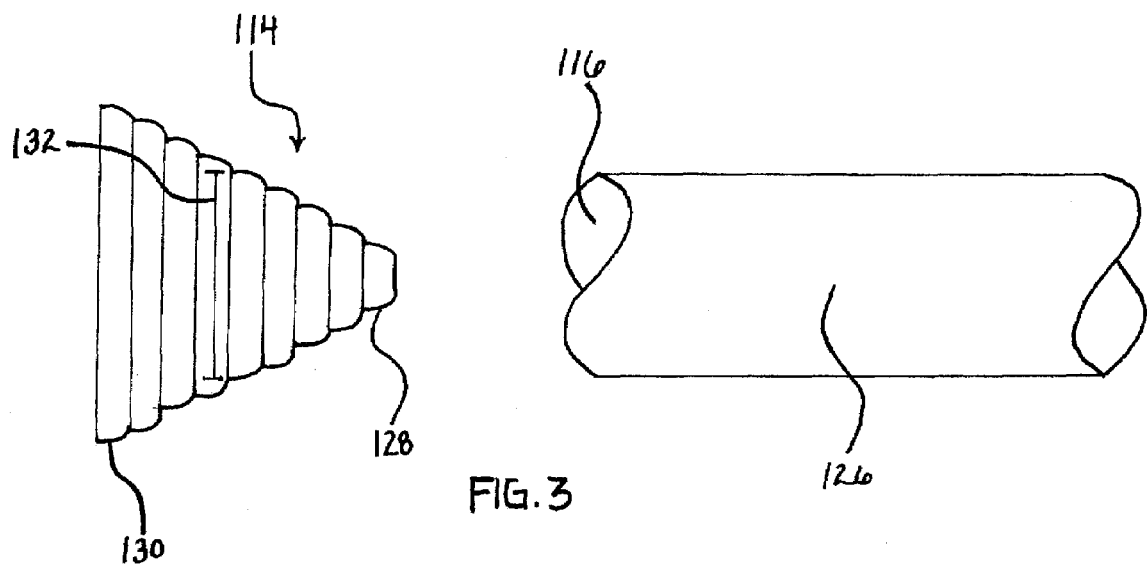
FIG. 3 is a front elevational view of a plug and an aperture, according to one embodiment of the invention.
Figure 4:
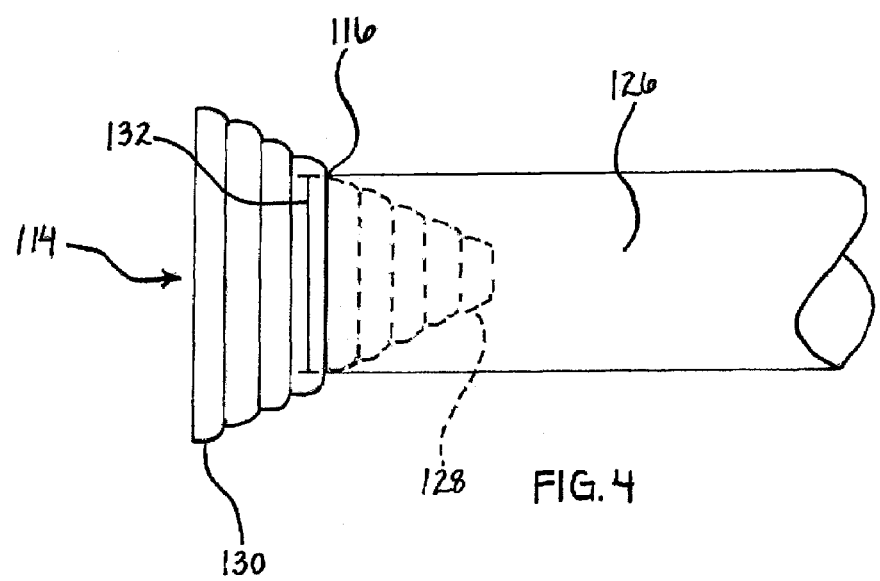
FIG. 4 is a front elevational view of a plug and an aperture, according to one embodiment of the invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

Looking to the figures, there is a plug kit for plugging apertures. Shown is a first plug 102 and a second plug 104. The first plug 102 has a first end 118 with a first diameter 108, and a second end 120 with a second diameter 106. The diameter of the first plug 102 decreases step-wise along a length of the first plug 102 from the first diameter 108 to the second diameter 106. The second plug 104 has a third end 122 with a third diameter 112, and a fourth end 124 with a fourth diameter 110. The diameter of the second plug 104 decreases step-wise along a length of the second plug 104 from the third diameter 112 to the fourth diameter 110. As illustrated, the fourth diameter 110 is smaller than the first diameter 108, and larger than the second diameter 106. In addition, the third diameter 112 is larger than the first diameter 108. Accordingly, the diameters of the first plug 102 and second plug 104 overlap.

Also shown is a plug 114 from a plug kit. The plug 114 is sized so that a diameter of the plug 114 corresponds to a diameter of an aperture 116 of a connector 126. For example, the plug 114 may be inserted into the aperture 116 so that an intermediate diameter 132, which is approximately equal to the diameter of the aperture 116, is frictionally fitted to the aperture 116. Accordingly, the plug 114 may be inserted into the aperture 116 and seal the aperture 116 by frictional resistance. Furthermore, a top end 128, with a diameter less than the aperture 116, is inside the connector 126, and a bottom end 130, with a diameter greater than the aperture 116, is outside the connector 126. Having a bottom diameter 130 greater than the aperture 116 allows the plug 114 to protrude from the connector 126 which provides a surface for gripping and removing the plug 114.

In operation, an aperture 116 of heavy equipment may leak oil or fuel and require plugging. Plugs 102, 104, 114, having overlapping diameters, may be provided by a plug kit. Advantageously, the overlapping diameters of the plugs 102, 104, 114 of the plug kit allow a plug 102, 104, 114 to be selected from the plug kit which protrudes during plugging for gripping for insertion and removal. A plug 114, having a diameter which size corresponds to the aperture 116, may be selected from among the plugs of the plug kit and inserted into the aperture 116 for plugging. Alternatively, another plug 102 and/or 104, also having a diameter which size corresponds to the aperture 116 may be selected and inserted for plugging. The aperture 116 may then be sealed by the frictional resistance of the plug 102, 104, 114, preventing leaking and/or contamination.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

For example, although the diameters of the plugs 102, 104, 114 of the plug kit correspond and/or overlap, each of the diameters of the plugs 102, 104, 114 may be substantially different. For example, the first plug 102 may have diameters in $1/16$ inch increments, such as $1/16$ of an inch, $1/8$ of an inch, $3/16$ of an inch, $1/4$ of an inch, $5/16$ of an inch, $3/8$ of an inch, etc., and the second plug 104 may have diameters in $1/8$ inch increments, such as $1/8$ of an inch, $1/4$ of an inch, $3/8$ of an inch, $1/2$ of an inch, etc. Similarly, a plug 114 may have diameters in $1/20$ inch increments, such as $1/20$ of an inch, $1/10$ of an inch, $3/20$ of an inch, $1/5$ of an inch, $1/4$ of an inch, etc. Accordingly, a plug 114 in a plug kit may have a diameter which corresponds with a variety of apertures 116.

In one embodiment, the plug kit includes five plugs. Each plug is $1/8$ of an inch in length, and each plug increases step-wise in $1/16$ of an inch increments. The diameter of the first plug increases step-wise in $1/16$ of an inch increments from at or about $1/8$ of an inch to at or about $15/32$ of an inch. The diameter of the second plug increases step-wise in $1/16$ of an inch increments from at or about $1/4$ of an inch to at or about $3/4$ of an inch. The diameter of the third plug increases step-wise in $1/16$ of an inch increments from at or about $1/2$ of an inch to at or about 1 inch. The diameter of the fourth plug increases step-wise in $1/16$ of an inch increments from at or about $3/4$ of an inch to at or about 1 and $3/8$ of an inch. The diameter of the fifth plug increases step-wise in $1/16$ of an inch increments from at or about 1 and $1/16$ of an inch to at or about 1 and $13/32$ of an inch.

In another embodiment, the plug kit includes five plugs. Each plug is $1/8$ of an inch in length, and each plug increases step-wise in $1/32$ of an inch increments. The diameter of the first plug increases step-wise in $1/32$ of an inch increments from at or about $1/8$ of an inch to at or about $15/32$ of an inch. The diameter of the second plug increases step-wise in $1/32$ of an inch increments from at or about $1/4$ of an inch to at or about $3/4$ of an inch. The diameter of the third plug increases step-wise in $1/32$ of an inch increments from at or about $1/2$ of an inch to at or about 1 inch. The diameter of the fourth plug increases step-wise in $1/32$ of an inch increments from at or about $3/4$ of an inch to at or about 1 and $3/8$ of an inch. The diameter of the fifth plug increases step-wise in $1/32$ of an inch increments from at or about 1 and $1/16$ of an inch to at or about 1 and $13/32$ of an inch.

In yet another embodiment, the plug kit includes five plugs. Each plug is $1/8$ of an inch in length, and each plug increases step-wise in $1/16$ and/or $1/32$ of an inch increments. The diameter of the first plug increases step-wise in $1/16$ and/or $1/32$ of an inch increments from at or about $1/8$ of an inch to at or about $15/32$ of an inch. The diameter of the second plug increases step-wise in $1/16$ and/or $1/32$ of an inch increments from at or about $1/4$ of an inch to at or about $3/4$ of an inch. The diameter of the third plug increases step-wise in $1/16$ and/or $1/32$ of an inch increments from at or about $1/2$ of an inch to at or about 1 inch. The diameter of the fourth plug increases step-wise in $1/16$ and/or $1/32$ of an inch increments from at or about $3/4$ of an inch to at or about 1 and $3/8$ of an inch. The diameter of the fifth plug increases step-wise in $1/16$ and/or $1/32$ of an inch increments from at or about 1 and $1/16$ of an inch to at or about 1 and $13/32$ of an inch.

Additionally, although the figures illustrate a specific number of steps, such as FIG. 1, which shows 11 steps for plugs 102, 104, the plugs 102, 104, 114 may have any number of steps known in the art. As one non-limiting example the plug 114 may have 10 steps. Likewise, although the figures illustrate a specific length, the plugs 102, 104, 114 may have any length corresponding to the number of steps. Further, there may be a variable step size and length on the same plug 102, 104, 114.

It is also envisioned that the plug kit may be used for sealing any aperture 116 known in the art. For example, the plug kit may be used to seal apertures, such as, but not limited to: heavy equipment apertures, factory equipment apertures, automobile apertures, boat apertures, plumbing apertures, and/or aviation apertures, as well as any other hose, fitting, line, and/or valve body. Further, heavy equipment apertures may include apertures of: bull dozers, loaders, graders, cranes, forklifts, plows, excavators, scrapers, backhoes, heavy compressors, generators, rollers, etc. and other heavy equipment known in the art. In another example, the plug kit may be used to concurrently and/or successively seal any aperture, such as, but not limited to: gas lines, coolant lines, refrigeration lines, hydraulic lines, valve bodies, and/or any other fluid drive known in the art.

The plug kit may contain any number of plugs as well. Although two plugs 102, 104 are shown in FIG. 1, the plug kit may contain any number of plugs for sealing a number of apertures. Likewise, the plugs may be used to seal apertures concurrently and/or successively.

It is expected that there could be numerous variations of the design of this invention. An example is that the steps may have straight edges and/or be angular, rather than curved.

Finally, it is envisioned that the components of the device may be constructed of any flexible solid material known in the art which seals apertures 116 and prevents contamination. Some non-limiting examples of flexible solid materials for plugs 102, 104, 114, include: poly urethane, rubber, plastic, cork, and/or wood. Further, the material selected for construction may be appropriate for use with a variety of fluids, such as: oil, hydraulic, fuel, coolant, refrigeration, etc.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A plug kit for sealing apertures consisting of a plurality of plugs, the plurality of plugs comprising:
   a) a first plug for sealing an aperture, conically shaped, wherein an entire body of the plug is solid and, wherein the entire body is flexible, consisting of:
      i) a first end with a first diameter; and
      ii) a second end, opposite the first end, the second end having a second diameter smaller than the first diameter, wherein the diameter of the first plug decreases step-wise along a length of the first plug according to a first step increment; and
   b) a second plug for sealing an aperture, conically shaped, wherein the entire body of the plug is solid, and wherein the entire body is flexible, consisting of:
      i) a third end with a third diameter, wherein the third diameter is larger than the first diameter; and
      ii) a fourth end, opposite the third end, the fourth end having a fourth diameter smaller than the third diameter, smaller than the first diameter, and larger than the second diameter, wherein the diameter of the second plug decreases step-wise along a length of the second plug according to a second step increment that is different from the first step increment and a whole number multiple of the first step increment, and
   wherein the step-wise diameter decrease of the first and second plugs is orthogonal to the length along the interior of each step and in equal diameter increments such that each step is well-defined and of the same incremental diameter change.

2. The plug kit of claim 1, wherein the first step increment is selected from the group consisting $\frac{1}{32}$ of an inch and $\frac{1}{16}$ of an inch.

3. The plug kit of claim 2, wherein the diameters of the ends of the second plug are substantially different than the diameters of the ends of the first plug.

4. The plug kit of claim 3, wherein the length of the first plug is smaller than the length of the second plug.

5. The plug kit of claim 4, wherein the first and second plugs include polyurethane and the second step increment is double the first step increment.

6. The plug kit of claim 1, wherein the orthogonal step-wise decrease in diameter has a curved step exterior and a orthogonal step interior.

7. A plug kit for sealing apertures, comprising:
   a) a first plug sealing an aperture, consisting essentially of:
      i) a first end with a first diameter; and
      ii) a second end, opposite the first end, the second end having a second diameter smaller than the first diameter, wherein the diameter of the first plug decreases step-wise along a length of the first plug according to a first step increment; and
   b) a second plug for sealing an aperture, consisting essentially of:
      i) a third end with a third diameter, wherein the third diameter is larger than the first diameter; and
      ii) a fourth end, opposite the third end, the fourth end having a fourth diameter smaller than the third diameter, smaller than the first diameter, and larger than the second diameter, wherein the diameter of the second plug decreases step-wise along a length of the second plug according to a second step increment that is different from the first step increment, and
   wherein the step-wise diameter decrease of the first and the second plugs is orthogonal to the length along the interior of each step and in equal diameter increments such that each step is well-defined and of the same incremental diameter change.

8. The plug kit of claim 7, wherein the diameter increments of the first and second plugs correspond to standard aperture sizing and the second step increment is a whole number multiple or fraction of the first step increment.

9. The plug kit of claim 8, wherein the diameters of the ends of the second plug are substantially different than the diameters of the ends of the first plug.

10. The plug kit of claim 9, wherein the length of the first plug is smaller than the length of the second plug.

11. Then plug of claim 10, wherein the first and the second plugs include polyurethane.

* * * * *